H. L. TANNER.
POTENTIAL REGULATING SYSTEM.
APPLICATION FILED NOV. 2, 1915.
1,374,165. Patented Apr. 5, 1921.
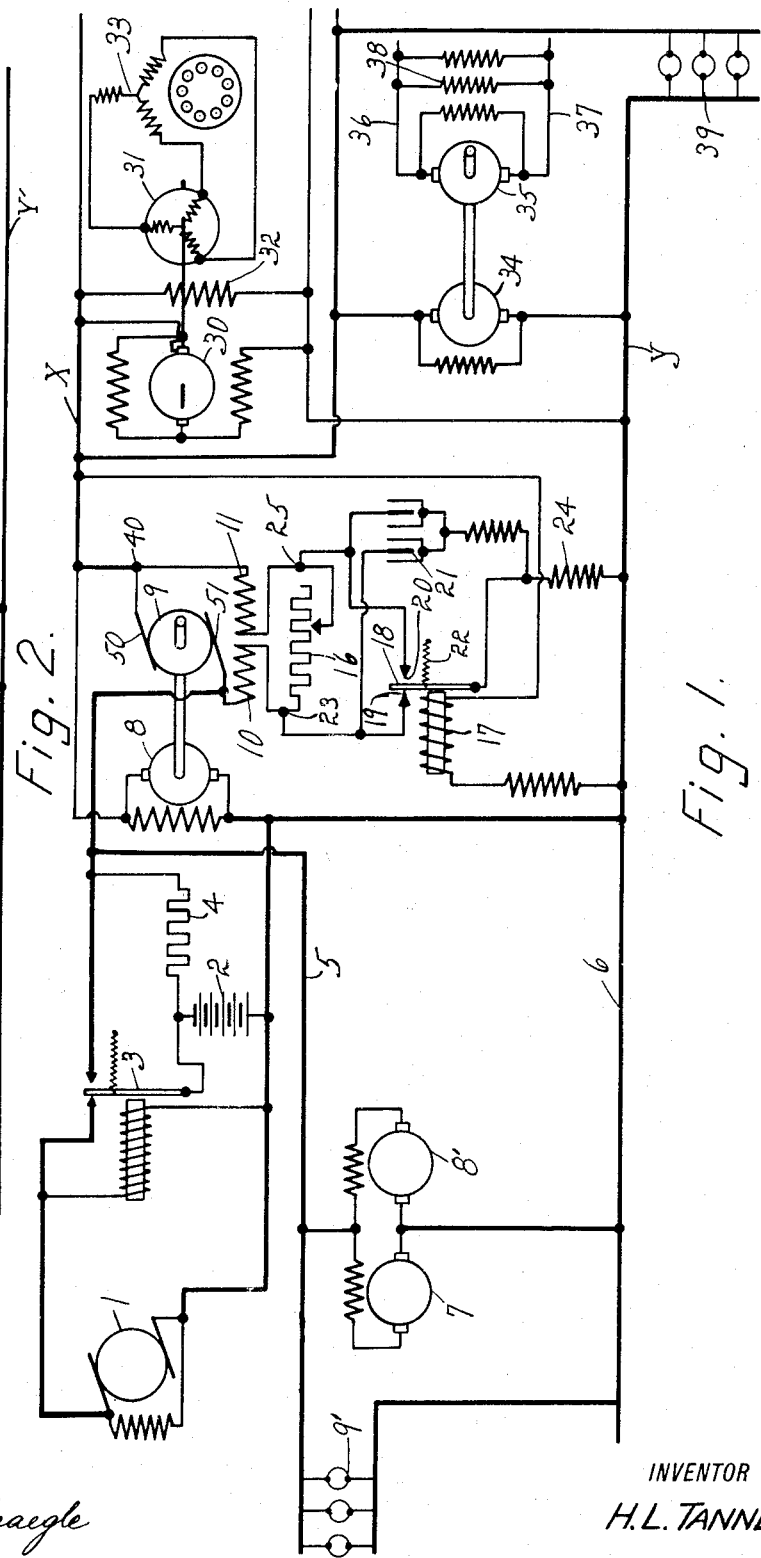
INVENTOR
H. L. TANNER.
BY
Herbert H. Thompson,
ATTORNEY.
WITNESSES:
Aug. F. Schraegle

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

POTENTIAL-REGULATING SYSTEM.

1,374,165.   Specification of Letters Patent.   Patented Apr. 5, 1921.

Application filed November 2, 1915. Serial No. 59,299.

*To all whom it may concern:*

Be it known that I, HARRY L. TANNER, a citizen of the United States of America, residing at 221 Eastern Parkway, Brooklyn, New York, have invented certain new and useful Improvements in Potential-Regulating Systems, of which the following is a specification.

It has now become quite common to employ on warships of all types the gyroscopic compass, instead of the magnetic compass; notably the Sperry gyroscopic compass, which comprises not only a master compass but one or more repeater compasses. For operating this system, it is found necessary to maintain several independent electric circuits of different characteristics, in each of which, the voltage must be kept constant. Alternating current is preferred for driving the gyro-rotor, while low voltage direct current is used for the repeater system.

Quite a difficult problem was presented in the driving of a compass set on a submarine, since great fluctuations in the main supply voltage occur in this type of craft, the voltage being the highest when the main generator is running and the lowest when the submarine is being driven by the storage batteries. When using the nickel-iron storage battery the voltage drops under such circumstance to about one half its normal value. It is the object of the present invention to provide a positive means for supplying current to a gyro-compass on a submarine, at a constant potential.

Referring to the drawing: Figure 1 is a diagrammatic view of my invention and Fig. 2 is a diagrammatic view illustrating how some of the features of the system shown in Fig. 1 may be modified.

Fig. 1 of the drawing illustrates one embodiment of my invention. 1 is a main generator on the submarine and 2 the storage battery. An automatic cut out switch 3 is shown to disconnect the generator when its voltage drops below a certain amount. Also I may provide a resistance 4 which is thrown in series with the load only when the generator is charging the batteries, to maintain a more constant voltage on the load. The main circuit is represented by wires 5 and 6, on which circuit are propelling motors 7 and 8' and the other translating devices, represented at 9'.

The gyro-compass system is shown in the diagram to the right of the apparatus so far described. For maintaining a constant voltage, I make use of a special form of motor-generator set, 8, 9, the principal characteristics of which were set forth in my co-pending application system of electrical distribution, Serial No. 859,087, filed August 29, 1914. The machine 8 may be a standard, shunt wound motor, while machine 9 is a special form of generator, its field windings being shown at 10, 11.

No special winding is required, however, since machine 9 may be a standard shunt wound generator in every respect except that a resistance 16 is tapped in between the field coils thereof. Of course two separate windings may be provided, if desired. Resistance 16 is made high enough so that the machine will not build up normally. A vibratory contact making voltage regulator is connected to each end of the resistance 16. Essentially this instrument comprises a solenoid 17 connected in paarallel with the load. The armature 18 of the solenoid vibrates between contact points 19 and 20, which are connected between the resistance and the coils 10 and 11 respectively. Condensers 21 may be provided to reduce sparking. A spring 22 opposes the pull of solenoid 17 and the two are so adjusted that the spring will hold the armature switch 18 against contact 20 until the voltage on the load exceeds a predetermined amount when the solenoid 17 will draw switch 18 against contact 19. In operation, the switch vibrates rapidly between the contacts.

Taking up now the action of the voltage regulator on the field coils 10 and 11 let us suppose that X is positive and that the battery 2 is furnishing a voltage considerably lower than that which is being maintained across the load and switch 18 is in contact with 20. Machine 9 will then act as a booster or generator, pumping current in the same direction as battery 2. If the upper brush 50 is at the higher potential, current will flow from this brush to point 40, where it will divide, the main part going to the load, while the shunted portion will flow through coil, 11 and will divide at point 25, a portion going through switch 18, directly to a point of relatively low potential preferably to main return circuit Y, through a resistance 24, while the remaining portion of the current will flow through resistance 16 and coil 10 to the other brush 51. The apparatus is so designed that when these conditions, are present, the booster will, under normal conditions, build the voltage up above the desired voltage, causing solenoid 17 to draw armature 18 into contact with point 19. This throws resistance 16 in series with coil 11 which would tend to reduce the current in said coil. At the same time a circuit from the positive main 5 to the negative side of the line is formed down through coil 10 to point 23, to contact 19 through armature 18 and resistance 24, thus introducing an electromotive force in coil 10, in such direction as to oppose the current then flowing. This new E. M. F. is at first opposed by the inductance of coil 10 and hence the effect at first is merely to reduce the current flowing through said coil. Thus the strength of both fields 10 and 11 will be lessened which will immediately reduce the boosting effect of the machine. If at this point in the cycle of operation the voltage is sufficiently reduced, the switch 18 will again be returned to point 20 and this cycle repeated. But if at said point the voltage is not sufficiently reduced the switch will remain up a little longer, the induction of coil 10 will be overcome and the current through coil 10 will reverse and start to build up the strength. At this point it will be noted that coils 11 and 10 are opposing each other. Coil 10 will speedily build up stronger than coil 11 and as soon as this occurs the whole machine will start to act as a bucker and produce an electro motive force opposed to that of the main line. This will reduce the E. M. F. across coil 11 and will if continued produce a counter E. M. F. which will reverse it, causing it to assist coil 10 in producing a magnetic field. The above cycle is what would take place if switch 18 remains in contact with contact 19 for a sufficient length of time, but of course if at any time during that period the voltage on the load falls a sufficient amount, this contact will be broken and a contact through point 20 completed which will start a cycle similar to the one just described, but acting to cause the opposite effect, the first being as before to weaken the field of the bucker by a counter electro-motive force impressed across coil 11 and a resistance thrown in circuit with coil 10. It will at once be recognized by those skilled in the art that the period of time occupied in completing a cycle or a portion thereof is very short, so that in operation the switch 18 vibrates rapidly. I also wish it to be understood that the above description of the electrical reactions of the apparatus embody only the most pronounced and essential features, the minor effects being omitted for the sake of clearness. What I have provided is a single regulating means which will not only vary the field strength of the machine 9, but will reverse the field, thus doubling the range of regulation.

Instead of connecting the motor 8 to the main supply circuit, as shown in said other application, I prefer to connect it across the regulated line X, Y, as shown, thereby securing closer regulation over greater variations in the voltage of the main supply, since a more constant speed of booster 9 is attained.

In the regulated line is located a D. C.-A. C. motor generator set, the motor 30 being preferably compound wound and the generator being a three phase inductor alternator 31 having its field 32 excited from the line. The induction motor which serves to drive the gyroscope and forms a part thereof is shown at 33.

The Sperry compass also makes use of a low voltage D. C. supply for driving the repeater compasses and for controlling certain parts of the master compass. As this voltage is much lower than that of line X, Y, being about 20 volts as compared to 90 volts in the regulated line, I employ another motor generator set 34, 35 which supplies line 36, 37 on which the translating devices 38 mentioned above are located. If desired, the regulated line X, Y, may also be used to supply lamps 39 for lighting the submarines.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Several modifications that my invention may assume are suggested in Fig. 2. In this figure, the driving motor 108 is shown as connected on the main line, rather than on the regulated line. As in the main form of the invention, connections are provided to make a circuit around resistance 116 to a point of different potential, but a method is shown whereby the said resistance is short circuited, so that the two coils 110 and 111 are connected in series. Certain advantages are rendered possible by this arrangement. Vibratory switch 118 is provided as before, controlled by solenoid or electro-magnet 117. In parallel with contact points 119 and 120 are placed a second pair of contacts 60, 61, forming a part of double throw pivoted switch 62. One pole of the switch is provided with a plurality of windings 63, 64 and the other pole with a plurality of windings 63', 64', these windings being so connected and arranged that when coils 63 and 64 are aiding each other, coils 63' and 64' are opposing each other and vice versa. Coils 63, 63' are connected across the regulated line and may be placed in series with solenoid 117, as shown. Coils 64 and 64' are preferably placed in parallel with machine 109. A centralizing spring 65 serves to hold switch 62 normally in the middle position until the difference in the strength of the two poles becomes great enough to draw it one way or the other. The parts are so designed that switch 62 will normally close after switch 118, during a gradual rise or fall in the supply voltage. Instead of employing condensers, I have shown a tap from the middle of resistance 116 to switches 118 and 62 for the purpose of reducing sparking.

The action of the regulator of Fig. 2 is as follows: Assuming that the supply voltage is somewhat under the value at which the load line X' Y' is to be held switch 118 will contact with point 120 and the machine 109 will be boosting. Under these conditions current will be flowing up, in coil 63 and down in 64 (assuming that X' is the positive side of the line); i. e., coils 63 and 64 will be opposing each other and coils 63' and 64' aiding each other. If the booster voltage at this time is comparatively low coils 63' and 64', even though aiding each other, will not be strong enough to attract the armature 62. If, however, the supply voltage drops still further the booster voltage will pick up, due to the fact that switch 118 will engage point 120 for a longer time, and the current through coils 64 and 64' increased. This increase will cause the pole on which 63 and 64 are mounted to become still weaker and the pole on which 63' and 64' are mounted to become stronger. The last mentioned pole will cause the switch 62 to engage contact 60 and thus complete a short-circuit across resistance 116 from coil 110 to coil 111. When the line voltage rises above the value at which the load line X', Y', is to be held, the switch 118 disengages contact 120 and engages contact 119. This operation places upper half of resistance 116 in series with section 111 and impresses a counter E. M. F. on section 110. This will reduce the boosting voltage and if contact at 119 persists the E. M. F. will reverse and the machine will be bucking. If contact at 119 is further prolonged the bucking voltage will reach a value sufficient to cause windings 64, 64' to be energized sufficiently to throw the switch 62 into engagement with contact 61. The entire resistance 116 will then be shunted out and the machine 109 will be exerting its maximum bucking E. M. F. It will thus be seen that this modification possesses all the advantages of the form shown in Fig. 1 with the additional advantage that a greater range of regulation and efficiency is attained by utilizing both field coils 110 and 111 to their full capacity.

Having described my invention, what I claim and desire to secure by Letters Patent is:

1. Means, for regulating the voltage of a supply line, comprising a dynamo-electric machine, means for causing said machine to either aid or oppose the voltage in said supply line and means controlled by the E. M. F. generated by said machine for strengthening the field thereof when said E. M. F. exceeds a predetermined amount.

2. Means, for regulating the voltage of a supply line, comprising a dynamo-electric machine, a resistance in series with the field winding thereof and means controlled by the magnitude and sign of the E. M. F. generated by said machine for cutting out said resistance to strengthen the field when said E. M. F. exceeds a predetermined amount in either direction.

3. Means for regulating the voltage of a supply line, comprising a dynamo-electric machine, a resistance in series with the field winding thereof and means including a polarized relay controlled by the E. M. F. generated by said machine for short-circuiting said resistance to strengthen the field when said E. M. F. exceeds a predetermined amount.

4. In combination, a supply line, a dynamo connected in series with said line, a field winding for said dynamo, a resistance inserted in said field winding, means, controlled by the voltage of the line beyond said dynamo, for short-circuiting a portion of said resistance and additional means controlled by the E. M. F. generated by said dynamo for short-circuiting a portion of said resistance.

5. In combination, a supply line, a dynamo connected in series with said line, a field winding for said dynamo, a resistance inserted in said field winding, means, controlled by the voltage of the line beyond said dynamo, for short-circuiting a portion of said resistance and additional means controlled by the E. M. F. generated by said dynamo for short-circuiting the same portion of said resistance.

6. In combination, a supply line, a dynamo connected in series with said line, a field winding for said dynamo, a resistance inserted in said field winding, means, controlled by the voltage of the line beyond said dynamo, for short-circuiting a portion of said resistance and additional means controlled by the E. M. F. generated by said dynamo for short-circuiting the remainder of said resistance.

7. In combination, a supply line, a dynamo inserted in one side thereof having a shunt field winding of two sections, means, controlled by the voltage of the supply line beyond said dynamo, for connecting either of the adjacent ends of said field sections to the other side of said line and a connection between said adjacent ends controlled by the E. M. F. generated by said dynamo.

8. In combination, a line circuit, a voltage regulator therein comprising a dynamo-electric machine, a plurality of field windings therefor in series with one another, a resistance placed between said windings in series therewith, means responsive to variations in the voltage of the regulated line for completing a circuit around said resistance from a point adjacent the connection of a winding with said resistance to a point of different potential, and means controlled by the E. M. F. of said dynamo-electric machine for short-circuiting said resistance.

9. In combination, a line circuit, a voltage regulator therefor comprising a dynamo-electric machine, a plurality of field windings therefor in series with one another, a resistance placed between said windings in series therewith, means responsive to variations in the voltage of the regulated line for completing a circuit around said resistance from a point adjacent the connection of either of said windings with said resistance to a point of different potential, and means controlled by the E. M. F. of said dynamo-electric machine for short-circuiting said resistance.

10. A voltage regulator comprising a dynamo-electric machine adapted to be placed in series with a variable line, a shunt field circuit therefor having a resistance high enough to prevent the building up of the machine, means for causing the building up of the machine by completing a circuit around a portion of the field circuit, means controlled by a rise in potential of said machine for causing a further rise in potential thereof, and means for driving said machine.

11. In combination, a supply line, a dynamo inserted in one side of the line, a shunt field winding for said dynamo having a resistance high enough to prevent the building up of the machine, means responsive to variations in voltage on the line for causing the building up of the machine in either direction by completing a circuit around one portion or another of said field circuit and means responsive to a rise in potential of said dynamo beyond a predetermined amount for causing said dynamo to build up higher.

12. In combination, a supply line, a dynamo connected thereto, means controlled by the voltage of said line for reversing the field of said dynamo to cause it to generate an E. M. F. either positive or negative with respect to said line and means controlled by a certain rise in E. M. F. of said dynamo for causing a further rise in said E. M. F.

13. In combination, a supply line, a dynamo connected in one side of said line, a shunt field winding for said dynamo, means adapted to form electrical connection from a point within said winding to the other side of said line and means responsive to an increase of E. M. F. of said dynamo for causing a further increase.

14. In combination, a dynamo, a shunt field circuit therefor having a resistance high enough to prevent building up of said dynamo, voltage controlled means for causing said dynamo to build up and means responsive to a rise in potential of said dynamo for causing a further rise in said potential.

15. In combination, a dynamo, a shunt field circuit therefor having a resistance high enough to prevent building up of said dynamo, voltage controlled means for causing said dynamo to build up in either direction and means responsive to a rise in potential of said dynamo for causing a further rise in said potential.

16. Means for regulating the voltage of a supply system, comprising a dynamo-electric machine, a plurality of field coils connected in series thereon, means responsive to variations in the voltage on the load for causing a counter E. M. F. across one of said coils and a simultaneous introduction of resistance into another of said coils and voltage controlled means for shunting out said resistance on a rise in E. M. F. across said machine.

17. In combination, a supply line, a voltage regulating dynamo comprising an armature and a shunt field winding, said armature being in series with one side of said line, a plurality of taps from said shunt field winding and means controlled by the voltage across said dynamo for connecting said taps to the other side of said line.

18. In combination, a supply line, a voltage regulating dynamo comprising field coils and an armature, said armature being in series with one side of said line, one of said field coils being connected at one end to one side of said line, another of said field coils being connected at one end to the same side of said line and means governed by the voltage across said dynamo for connecting either of the other ends of said above mentioned coils to the other side of said line.

19. In combination, a supply line, a voltage regulating dynamo, comprising a field winding, in series with one side of said line, a connection between an intermediate point of said field winding and the opposite side of said line and means controlled by the voltage across said field winding for making and breaking said last named connection.

20. In combination, a supply line, a dynamo comprising field coils and an armature, said armature being connected in series with one side of said line, a connection between one end of one of said coils and one terminal of said armature, a connection between one end of another of said field coils and the other terminal of said armature and means controlled by the voltage across said armature for connecting the other ends of said last mentioned field coils to the other side of said line.

21. In combination, a supply line, a dynamo having a plurality of field coils each connected at one end to one side of said line, a resistance connected between the other ends of said coils, a connection from said resistance to the other side of said line, and means governed by the voltage across the dynamo for short circuiting a part of said resistance.

22. In combination, a supply line, a dynamo in series with said line and comprising a multi-section field winding, a connection between one field section and another, means controlled by the voltage across said line for controlling said connection and means controlled by the voltage across said dynamo for controlling said connection.

23. In combination, a dynamo having a field winding of a plurality of sections, means for introducing a resistance in series with one of said sections and simultaneously impressing a counter E. M. F. on another of said sections and means responsive to the voltage across said dynamo for removing said resistance.

24. In combination, a supply line, a dynamo having a plurality of field sections each connected at one end to one side of said line, means connecting the other ends of said sections and the other side of said line and means comprising a polarized relay for controlling said connecting means.

25. In combination, a supply line, a dynamo having a plurality of field sections each connected at one end to one side of said line, a connection between the other end of one of said sections and the opposite side of said line, a connection between the other end of another of said sections and the last mentioned side of said line, a polarized voltage responsive relay for controlling one of said connections and means responsive to the voltage across said line for controlling the other of said connections.

26. In combination, a supply line, a dynamo having a plurality of field sections each connected at one end to one side of said line, connections between the other ends of said sections and the opposite side of said line, means comprising a polarized relay for controlling said connections, additional connections between the last mentioned ends of said sections and the last mentioned side of said line and voltage responsive means for controlling said last mentioned connections.

27. In combination, a generator and means controlled by the magnitude and sign of the E. M. F. across said generator for varying the field thereof.

28. In combination, a supply line, a dynamo having a plurality of field sections each connected at one end to one side of said line, a connection between the other end of one of said sections and the opposite side of said line, a connection between the other end of another of said sections and the last mentioned side of said line, and means responsive to the magnitude of the E. M. F. across said machine for closing one or the other of said connections depending on the polarity of said dynamo.

29. The combination with a circuit and a source of electrical energy adapted to be connected thereto, of automatic means for regulating the voltage thereof comprising an auxiliary source of voltage adapted to be inserted in series with said circuit, electro-responsive means for controlling the direction of the voltage of said auxiliary source with respect to the voltage of the main source, and independent electro-responsive means for controlling the value of the voltage of said auxiliary source.

30. Means for regulating the voltage of a supply line, comprising a dynamo in series with said line and means controlled by the magnitude and sign of the E. M. F. across said dynamo for varying the field thereof.

31. Means for regulating the voltage of a supply line comprising a dynamo in series with said line, means controlled by the voltage across said line for causing the dynamo to either aid or oppose said voltage, and means controlled by the magnitude and sign of the E. M. F. across said dynamo for varying the field thereof.

32. In combination, a generator, and a polarized relay controlled by the magnitude and sign of the E. M. F. across said generator for varying the field thereof.

33. Means for regulating the voltage of a variable supply line, comprising a dynamo electric machine adapted to be constantly in circuit with said line, and means controlled by the E. M. F. generated by said machine for strengthening the field thereof when said E. M. F. exceeds a predetermined amount.

34. Means for regulating the voltage of a supply line, comprising a dynamo electric machine adapted to be constantly in series with the supply, and means controlled by the E. M. F. generated by said machine while in series with said supply for strengthening the field thereof when said E. M. F. exceeds a predetermined amount.

In testimony whereof I have signed my name to this specification, this first day of November, 1915.

HARRY L. TANNER.